No. 817,283. PATENTED APR. 10, 1906.
J. K. STEWART.
FLEXIBLE SHAFT.
APPLICATION FILED OCT. 30, 1905.
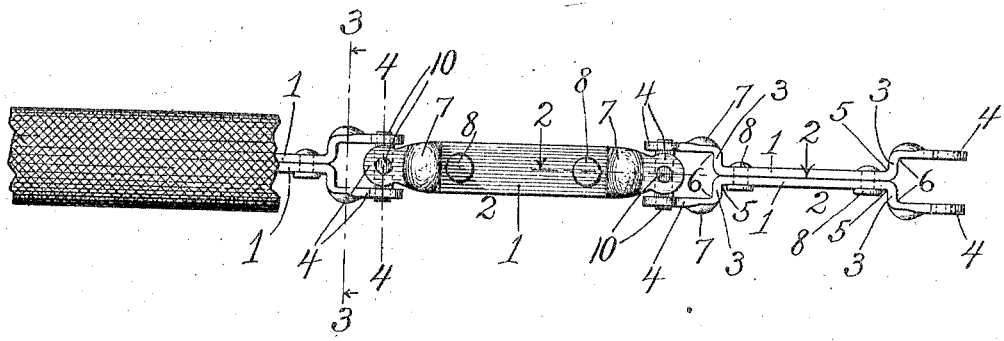
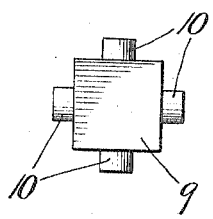
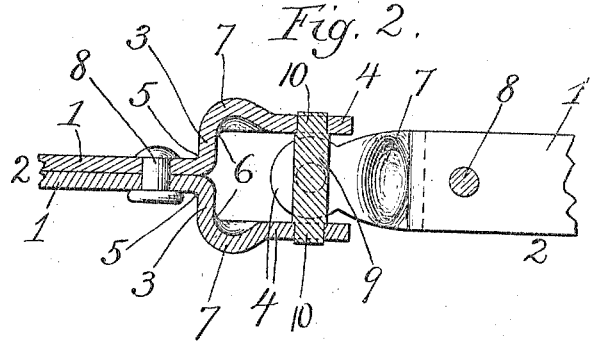
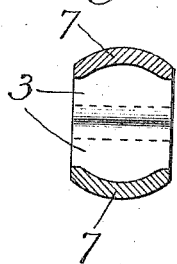
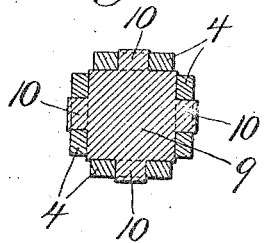
Witnesses.
Edward T. Wray.
M. Gertrude Ady
Inventor.
John K. Stewart
by Burton & Burton
his Attys.

UNITED STATES PATENT OFFICE.

JOHN K. STEWART, OF CHICAGO, ILLINOIS.

FLEXIBLE SHAFT.

No. 817,283.  Specification of Letters Patent.  Patented April 10, 1906.

Application filed October 30, 1905. Serial No. 284,973.

*To all whom it may concern:*

Be it known that I, JOHN K. STEWART, a citizen of the United States, residing at Chicago, in the county of Cook and State of Illinois, have invented new and useful Improvements in Flexible Shafts, of which the following is a specification, reference being had to the accompanying drawings, forming a part thereof.

This invention relates to flexible shafting, the purpose of the invention being to provide a flexible shaft especially adapted for both light and heavy work and adapted to be used in connection with an outer casing, the shaft being composed of links having a jointed connection with each other and provided with offset terminals struck outward, forming bosses which protrude beyond the adjacent joint and have their outer surfaces rounded to form bearing-shoulders which are adapted to coöperate with the outer casing by which the links are inclosed.

In the accompanying drawings, Figure 1 is a plan view of a portion of a flexible shaft, showing the usual outer casing and a portion of the shaft projecting therefrom. Fig. 2 is a longitudinal section at the line 2 2 on Fig. 1. Fig. 3 is a transverse section at the line 3 3 on Fig. 1. Fig. 4 is a section at the line 4 4 on Fig. 1. Fig. 5 is an elevation of the pivot-block.

The flexible shaft contemplated in this invention comprises a series of links arranged end to end and having a jointed connection with each other. Each link is rendered forked at both ends by being composed of twin members 1 1, each consisting of a strip of metal of suitable gage or thickness, according to the work to be performed. Said strip of which the link member is formed comprises a central body portion 2 and oppositely-arranged offset terminals joined with the body by the transversely-extending shoulder 3 and terminating in a directly-longitudinal end portion 4. In other words, each link member 1 is bent outward at the point 5 to form the transverse shoulder 3 and again bent at the point 6 to form the longitudinal end portion or extremity 4. This bending is performed in a suitable press between suitable dies, and in the process of bending up the terminals of the link members that portion of each terminal adjacent to the bend 6 is struck outward to form a boss 7, which is concavo-convex in both longitudinal and transverse section, as shown in Figs. 2 and 3, thus imparting to the outer surface of the boss convexity both transversely and longitudinally of the link member. The link members have their body portions brought together and riveted or otherwise fastened securely and rigidly, as shown at 8. Any number of links formed in the manner above described may be used in the construction of a flexible shaft, according to the length of shaft required. The links have a jointed connection at their adjacent extremities, and said jointed connection is shown as consisting of a pivot-block 9, having projecting pintles or journals 10, extending outward therefrom at four points equidistant from each other, the end portions 4 being provided with openings to receive said pintles or journals, as clearly illustrated in the drawings. Any suitable form of pivot-block may be used for connecting the links to give the necessary universal joint without departing from the principle of this invention, which resides in the link itself and the manner in which said link as a whole is formed. It will be observed that the offset portion of each link member is provided with a boss which protrudes beyond the body of the link and forms a guard for the extremities of the link-terminals and that the outer surface of said boss is rounded or curved in longitudinal and transverse section, thus doing away with all abrupt angles which might abrade the inclosing casing and increase friction, since said projecting bosses thus form rounded bearing-shoulders which are adapted to move in contact with the outer casing, the ordinary form of which is illustrated in Fig. 1, it being understood that any usual or preferred form or construction of outer casing may be utilized in connection with the flexible-shaft structure hereinabove particularly described.

The flexible shaft of this invention is particularly adapted for heavy work, it being noted that the links may be made of any desired size and strength, according to the work required of the completed shaft. In case of injury to the shaft, as by the breakage of one of the link members, such broken link member may be disconnected from its complemental member and replaced by a new member without the aid of special tools.

I claim—

1. A flexible shaft comprising forked links and intervening pivot-blocks to which the links are pivoted on lines transverse to each other, each link being composed of twin members extending side by side and having outwardly-offset terminals, each of which has an outwardly-convex boss protruding laterally beyond the body of the link.

2. A flexible shaft comprising forked links and intervening pivot-blocks to which the forks of the links are pivoted on lines transverse to each other, each link comprising twin members secured together, and each member having at each end one member of the fork for that end, each such fork member having an outwardly-convex boss protruding beyond the pivot.

In testimony whereof I have hereunto set my hand, at Chicago, Illinois, this 16th day of October, 1905.

J. K. STEWART.

Witnesses:
CHAS. S. BURTON,
M. GERTRUDE ADY.